(12) United States Patent
Wells et al.

(10) Patent No.: US 7,054,966 B2
(45) Date of Patent: May 30, 2006

(54) DATA PROCESSING SYSTEM

(75) Inventors: Owen N Wells, Waynesboro, VA (US);
Rajesh Hiranandani, Charlottesville, VA (US)

(73) Assignee: General Electric Company, Schenectady, NY (US)

( * ) Notice: Subject to any disclaimer, the term of this patent is extended or adjusted under 35 U.S.C. 154(b) by 25 days.

(21) Appl. No.: 10/710,030

(22) Filed: Jun. 14, 2004

(65) Prior Publication Data
US 2005/0278471 A1 Dec. 15, 2005

(51) Int. Cl.
*G06F 13/00* (2006.01)
*G06F 13/14* (2006.01)

(52) U.S. Cl. .................. 710/100; 710/107; 710/313; 370/912; 726/17

(58) Field of Classification Search ............... 710/100, 710/107, 110, 305, 313, 240, 33; 718/100, 718/104; 709/253; 712/28–30; 713/201; 370/349, 912; 726/117, 111; 361/600, 683; 439/604; 375/222
See application file for complete search history.

(56) References Cited

U.S. PATENT DOCUMENTS

| | | | |
|---|---|---|---|
| 4,504,906 A | 3/1985 | Itaya et al. | 364/200 |
| 5,349,690 A | 9/1994 | Frame et al. | 395/800 |
| 6,094,699 A | 7/2000 | Surugucchi et al. | 710/128 |
| 6,185,697 B1 * | 2/2001 | Shiraishi | 714/6 |
| 6,502,156 B1 | 12/2002 | Sacker et al. | 710/305 |
| 6,560,712 B1 | 5/2003 | Arends et al. | 713/320 |
| 6,662,251 B1 * | 12/2003 | Brock et al. | 710/110 |
| 2002/0003574 A1 * | 1/2002 | Kawamura | 348/222 |
| 2002/0099892 A1 * | 7/2002 | Olarig | 710/240 |
| 2002/0133651 A1 | 9/2002 | Wang et al. | 710/104 |
| 2003/0204682 A1 * | 10/2003 | Ueno | 711/147 |
| 2005/0177663 A1 * | 8/2005 | Jeong | 710/110 |

FOREIGN PATENT DOCUMENTS

EP  0710913 A1  5/1996

OTHER PUBLICATIONS

"IEEE standard for an 8-bit microcomputer bus system: STd bus" by Technical committee on Microprocessor and Microcomputer of the IEEE Computer Society, USA (abstract only) Publication date: Jun. 30, 1988.*
PCT International Search Report dated Sep. 15, 2005 fr International Application No. PCT/082005/012974, International Filing date Apr. 15, 2005.

* cited by examiner

*Primary Examiner*—Gopal C. Ray
(74) *Attorney, Agent, or Firm*—Cantor Colburn LLP (57) ABSTRACT

A data processing system in accordance with an exemplary embodiment is provided. The data processing system includes a first host device operably coupled to a first PCI communication bus wherein the first host device substantially only performs tasks associated with facilitating communication through the first PCI communication bus. The data processing system further includes a first processing device operably coupled to the first PCI communication bus. Finally, the data processing system includes second and third devices both operably coupled to the first PCI communication bus. The second device is configured to request authorization from the first host device to transmit a first message through the first PCI communication bus, wherein the second device transmits the first message to the third device upon receipt of the authorization from the first host device even if the first processing device is not operable.

20 Claims, 6 Drawing Sheets

DATA PROCESSING SYSTEM

BACKGROUND OF INVENTION

Computer systems having utilized a Peripheral Component Interconnect (PCI) communication bus having a central processing device (CPU) performing the dual functions of (i) performing mathematical calculations for various non-communication software programs, and (ii) performing host functionality for arbitrating or authorizing communication on one or more PCI busses between various devices coupled to the PCI busses. A drawback with this architecture, however, is that when the CPU is not operable the CPU is unable to perform the host tasks and therefore no communication can occur between devices coupled to the PCI busses.

Thus, there is a need for a system that will allow communication on PCI busses even if one or more of the CPUs coupled to the PCI busses are no longer operable.

SUMMARY OF INVENTION

A data processing system in accordance with an exemplary embodiment is provided. The data processing system includes a first host device operably coupled to a first PCI communication bus wherein the first host device substantially only performs tasks associated with facilitating communication through the first PCI communication bus. The data processing system further includes a first processing device operably coupled to the first PCI communication bus. Finally, the data processing system includes second and third devices both operably coupled to the first PCI communication bus. The second device is configured to request authorization from the first host device to transmit a first message through the first PCI communication bus, wherein the second device transmits the first message to the third device upon receipt of the authorization from the first host device even if the first processing device is not operable.

A data processing system in accordance with another exemplary embodiment is provided. The data processing system includes a first host device means operably coupled to a first PCI communication bus for only performing tasks associated with facilitating communication through the first PCI communication bus. The data processing system further includes a first processing device means operably coupled to the first PCI communication bus for performing computational tasks. The data processing system further includes second and third device means both operably coupled to the first PCI communication bus for communicating with one another. The second device means is configured to request authorization from the first host device means to transmit a first message through the first PCI communication bus, wherein the second device means transmits the first message to the third device means upon receipt of the authorization from the first host device means even if the first processing device means is not operable.

A data processing system in accordance with another exemplary embodiment is provided. The data processing system includes a first back plane having a first host device, a first PCI communication bus, and first, second, and third electrical connectors. The first host device is operably coupled to the first PCI communication bus. The first PCI communication bus is operably coupled to the first, second, and third, electrical connectors, wherein the first host device only performs tasks associated with facilitating communication through the first PCI communication bus. The data processing system further includes a first processing device operably coupled to the first PCI communication bus via the first electrical connector. The data processing system further includes second and third devices both operably coupled to the first PCI communication bus via the second and third electrical connectors, respectively. The second device is configured to request authorization from the first host device to transmit a first message through the first PCI communication bus, wherein the second device transmits the first message to the third device upon receipt of the authorization from the first host device even if the first processing device is not operable.

A method for controlling a data processing system in accordance with another exemplary embodiment is provided. The data processing system has a first host device operably coupled to a first PCI communication bus wherein the first host device only performs tasks associated with facilitating communication through the first PCI communication bus, and a first processing device operably coupled to the first PCI communication bus, and second and third devices both operably coupled to the first PCI communication bus. The method includes sending an authorization request signal from the second device to the first host device requesting authorization to transmit a first message over the first PCI communication bus. The method further includes upon receipt of the authorization from the first host device by the second device, transmitting the first message from the second device to the third device even if the first processing device is not operable.

An article of manufacture in accordance with another exemplary embodiment is provided. The article of manufacture includes a computer storage medium having a computer program encoded therein for controlling a data processing system. The data processing system has a first host device operably coupled to a first PCI communication bus wherein the first host device only performs tasks associated with facilitating communication through the first PCI communication bus, and a first processing device operably coupled to the first PCI communication bus, and second and third devices both operably coupled to the first PCI communication bus. The computer storage medium includes code for sending an authorization request signal from the second device to the first host device requesting authorization to transmit a first message over the first PCI communication bus. The computer storage medium further includes code for transmitting the first message from the second device to the third device even if the first processing device is not operable, upon receipt of the authorization from the first host device by the second device.

DETAILED DESCRIPTION

Figure 1:
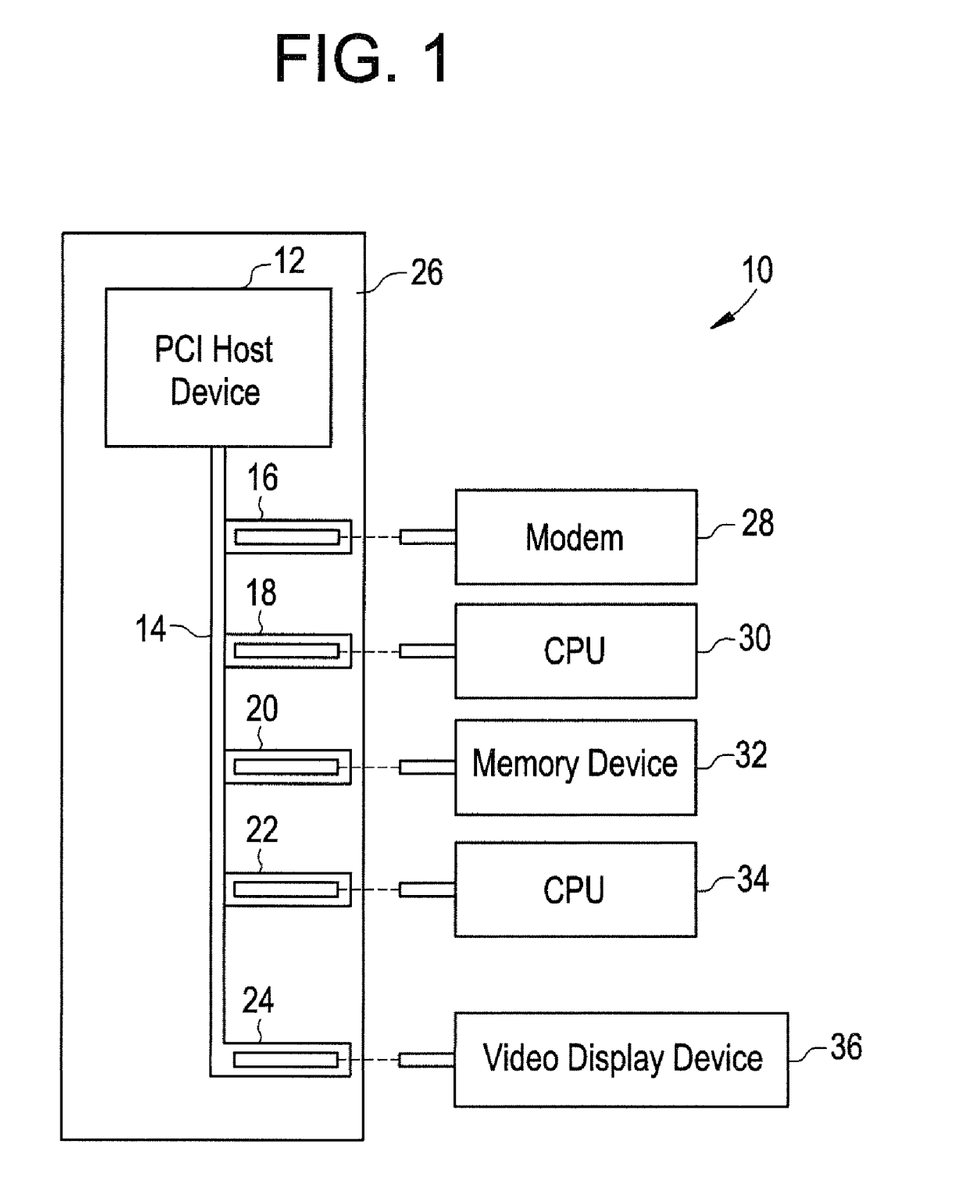
FIG. 1 is a schematic of the data processing system in accordance with an exemplary embodiment.

Referring to FIG. 1, a data processing system 10 for controlling data communication between PCI devices in accordance with an exemplary embodiment is provided. The data processing system 10 includes a PCI host device 12, a PCI communication bus 14, electrical connectors 16, 18, 20, 22, 24, a back plane 26, a modem 28, a CPU 30, a memory device 32, a CPU 34, and a video display device 36. A CPU or processing device herein is defined as any device capable of performing a computational task. An electrical connector is also referred to as an electrical slot to those skilled in the art. For example, electrical connector 16 is commonly referred to as "Slot 1" on the PCI bus.

The back plane 26 comprises a substrate on which the PCI host device 12, the PCI bus 14, and the electrical connectors 16, 18, 20, 22, 24 are attached. The PCI host device 12 is provided to substantially only perform tasks associated with facilitating communication through the PCI communication bus 14. The PCI host device 12 assigns a unique address range for each of the devices communicating over the bus 14. Further the PCI host device 12 configures the PCI interfaces in each of the devices communicating through the bus 14 and enables those PCI interfaces. Further, the PCI host device 12 authorizes only one device coupled to the bus 14 to communicate at a time on the bus 14. In order to communicate on the bus 14, a device operably coupled to the bus 14 sends an authorization request signal to the PCI host device 12. Thereafter, the PCI host device 12 can transmit an authorization granted signal to the requesting device that authorizes the device to transmit a message through the bus 14. A PCI communication bus comprises one of PCI 2.0, PCI 2.1, PCI 2.2, PCI 2.3, and any equivalents thereof. In an alternate embodiment, a PCI communication bus comprises one of a PCI-X bus, a Compact PCI bus, a PCI Express bus, and any equivalents thereof. Further, in another alternate embodiment, the PCI communication bus could be replaced with any other type of parallel communication bus or serial communication bus.

The PCI host device 12 is electrically coupled to the bus 14 and to the electrical connectors 16, 18, 20, 22, 24. The electrical connectors 16, 18, 20, 22, 24 are also electrically coupled to the bus 14.

The remaining devices of the data processing system 10 are electrically coupled to the PCI communication bus 14 via the electrical connectors. In particular, the modem 28, the CPU 30, the memory device 32, the CPU 34, and the video display device 36 are electrically coupled to the electrical connectors 16, 18, 20, 22, 24, respectively.

A substantial advantage of the system 10 is that communication can occur between devices through the PCI communication bus 14 even if one of the CPUs 30, 34 is not operable. For example, CPU 30 can communicate with the memory device 32 via the bus 14 even if the CPU 34 is not operable.

Figure 4:
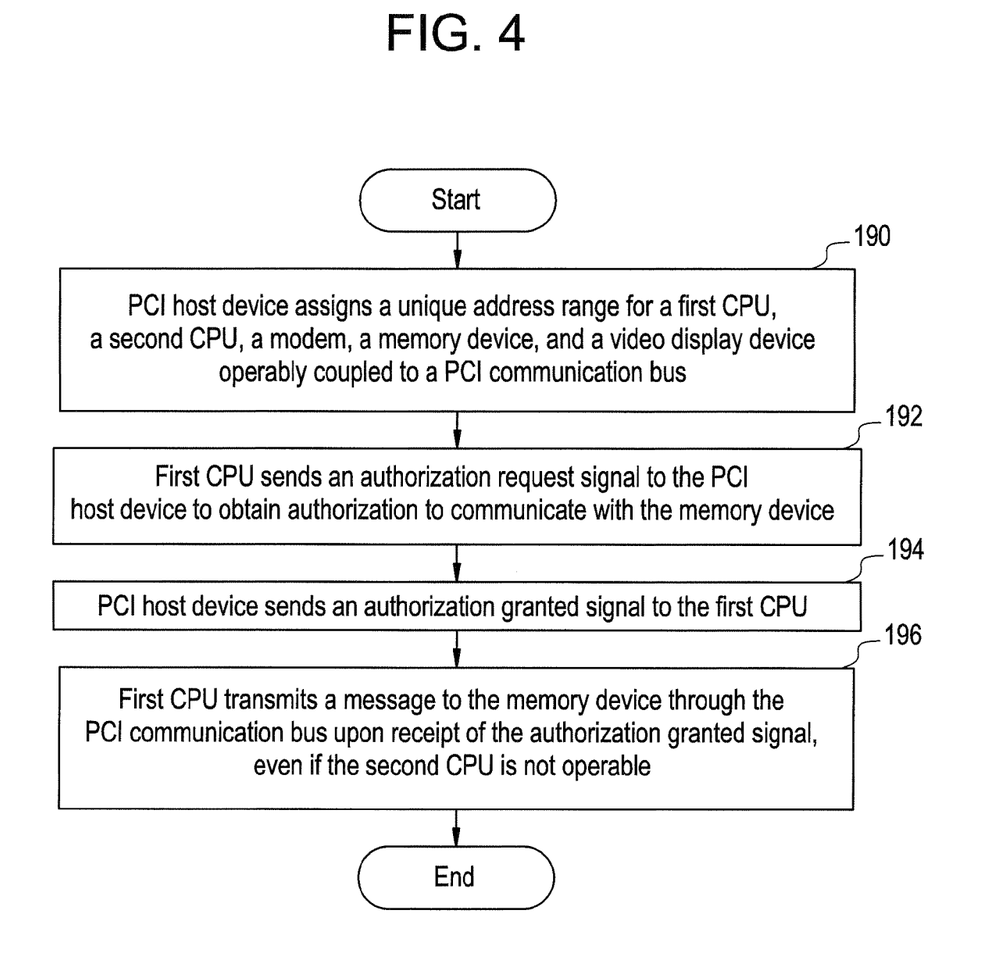
FIG. 4 is a flowchart of a method for controlling communication in the data processing system of the FIG. 1.

Referring to FIG. 4, a method for transmitting data within the data processing system 10 will now explained. It should be noted that although communication between the CPU 30 and the memory device 32 will be utilized to describe the operation of the system 10, any two devices on the bus 14 can communicate with one another through the bus 14 even if one of the CPUs 30, 34 are not operable.

At step 190, the PCI host device 12 assigns a unique address range to configure and enable the PCI interfaces to each of the CPU 30, the CPU 34, the modem 28, the memory device 32, and the video display device 36 operably coupled to the PCI communication bus 14.

At step 192, the CPU 30 sends an authorization request signal to the PCI host device 12 to obtain authorization to communicate with the memory device 32.

At step 194, the PCI host device 12 sends an authorization granted signal to the CPU 30.

At step 196, the CPU 30 transmits a message to the memory device 32 through the PCI communication bus 14 upon receipt of the authorization granted signal, even if the CPU 34 is not operable.

Figure 2:
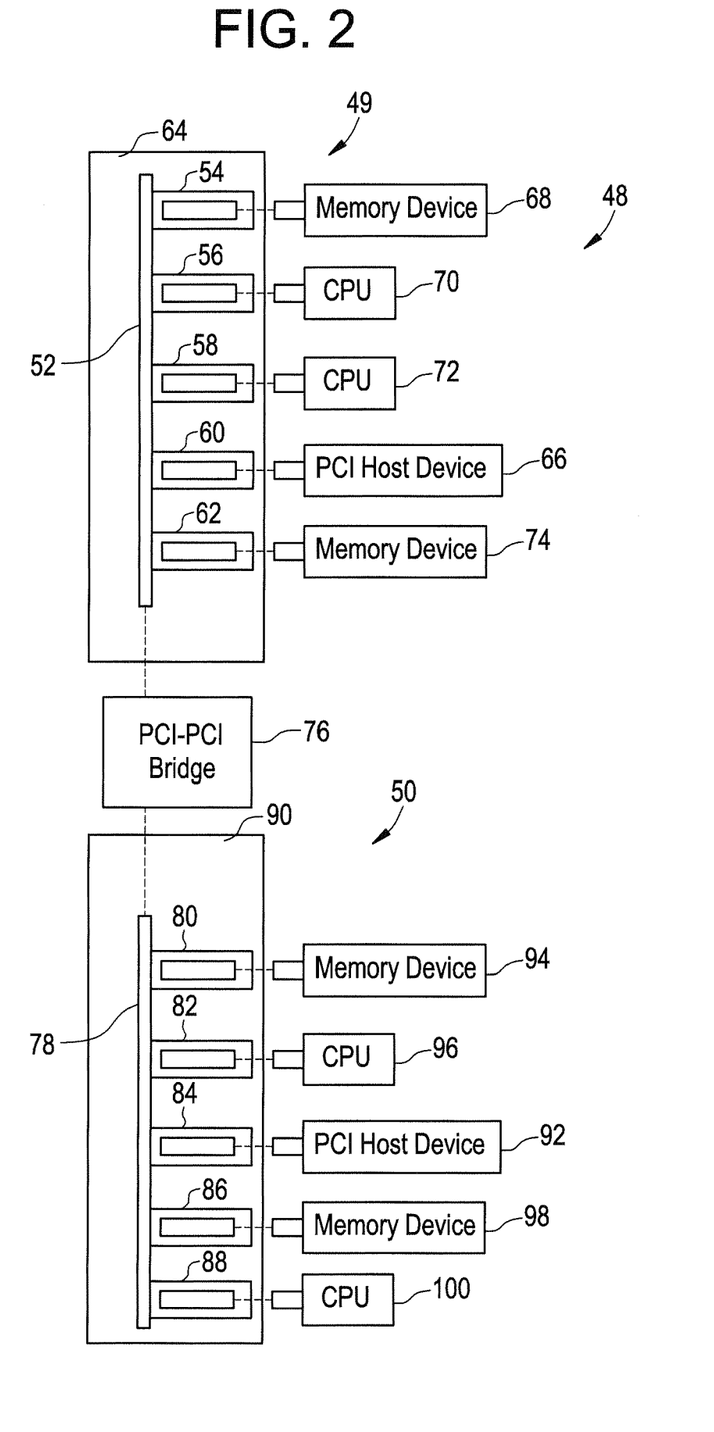
FIG. 2 is a schematic of the data processing system in accordance with another exemplary embodiment.

Referring to FIG. 2, a data processing system 48 for controlling data communication between PCI devices in accordance with another exemplary embodiment is shown. The data processing system 48 includes a subsystem 49, a subsystem 50, and a PCI-PCI bridge 76.

The subsystem 49 includes a PCI bus 52, electrical connectors 54, 56, 58, 60, 62, a back plane 64, a PCI host device 66, a memory device 68, a CPU 70, a CPU 72, and a memory device 74. The back plane 64 comprises a substrate on which the PCI bus 52 and the electrical connectors 54, 56, 58, 60, and 62 are attached. The primary difference between the back plane 64 and the back plane 26, discussed above, is that the PCI host device is not directly attached to the substrate of the back plane 64. Instead, the PCI host device 66 is electrically coupled to the electrical connector 60. The PCI host device 66 assigns a unique address range for each of the devices communicating over the PCI communication bus 52. Further, the PCI host device 66 configures the PCI interfaces in each of the devices communicating through the bus 52 and enables those PCI interfaces. Further, the PCI host device 66 authorizes only one device coupled to the bus 52 to communicate at a time on the bus 52. The PCI host device 66 is electrically coupled to the bus 52 and to the electrical connectors 54, 56, 58, 60, 62. The electrical connectors 54, 56, 58, 60, 62 are also electrically coupled to the bus 52.

The remaining devices of the subsystem 49 are electrically coupled to the PCI communication bus 52 via the electrical connectors. In particular, the memory device 68, the CPU 70, the CPU 72, and the memory device 74 are electrically coupled to the electrical connectors 54, 56, 58, 62, respectively.

The subsystem 50 includes a PCI bus 78, electrical connectors 80, 82, 84, 86, 88, a back plane 90, the PCI host device 92, a memory device 94, a CPU 96, a memory device 98, and a CPU 100. The back plane 90 comprises a substrate on which the PCI bus 78 and the electrical connectors 80, 88, 84, 86, 88 are attached. The PCI host device 92 is not directly attached to the substrate of the back plane 90. Instead, the PCI host device 92 is electrically coupled to the electrical connector 84.

The PCI host device 92 assigns a unique address range for each of the devices communicating over the PCI communication bus 78. Further, the PCI host device 92 configures the PCI interfaces in each of the devices communicating over the bus 78 and enables the PCI interfaces. Further, the PCI host device 92 authorizes only one device coupled to the bus 78 to communicate at a time on the bus 78. The PCI host device 92 is electrically coupled to the PCI communication bus 78 and to the electrical connectors 80, 82, 84, 86, 88. The electrical connectors 80, 82, 84, 86, 88 are also electrically coupled to the bus 78.

The remaining devices of the subsystem 50 are electrically coupled to the PCI communication bus 78 via the electrical connectors. In particular, the memory device 94, the CPU 96, the memory device 98, and the CPU 100 are electrically coupled to the electrical connectors 80, 82, 86, 88, respectively.

The data processing system 48 further includes a PCI-PCI bridge 76 that is operably coupled between the subsystems 49 and 50. In particular, the bridge 76 is electrically coupled between the PCI communication bus 52 and the PCI communication bus 78. Those skilled in the art will recognized that the bridge 76 can be operably coupled to the busses 52 and 78 using one of a plurality of known coupling configurations. The bridge 76 allows devices on the bus 52 to communicate with devices operably coupled to the bus 78, and vice versa.

An advantage of the data processing system 48 is that devices attached to the bus 52 can communicate with one another even if one or more of the CPUs coupled thereto are not operable. For example, the PCI host device 66 will allow communication on the bus 52 between CPU 72 and devices 68 and 74 even if CPU 70 is not operable. Similarly, devices operably coupled to the bus 78 can communicate with one another even if one or more of the CPUs coupled thereto are not operable. For example, the PCI host device 92 will allow communication on the bus 78 between CPU 100 and the memory device 94 even if the CPU 96 is not operable.

A further advantage of the data processing system 48 is that devices attached to the bus 52 can communicate with devices attached to the bus 78, even if one or more CPUs are not operable on either of the busses 52 and 78. For example, the CPU 70 on bus 52 can communicate with memory device 98 on bus 78, via the bridge 76, even if CPU 72, CPU 96, and CPU 100 are not operable.

A further advantage of the data processing system 48 is that the PCI host device 66 can be readily replaced if the PCI host device 66 becomes non-operable. In particular, the PCI host device 66 can be disconnected from the electrical connector 60 and a new PCI host device can be inserted within the electrical connector 60.

Figure 3:
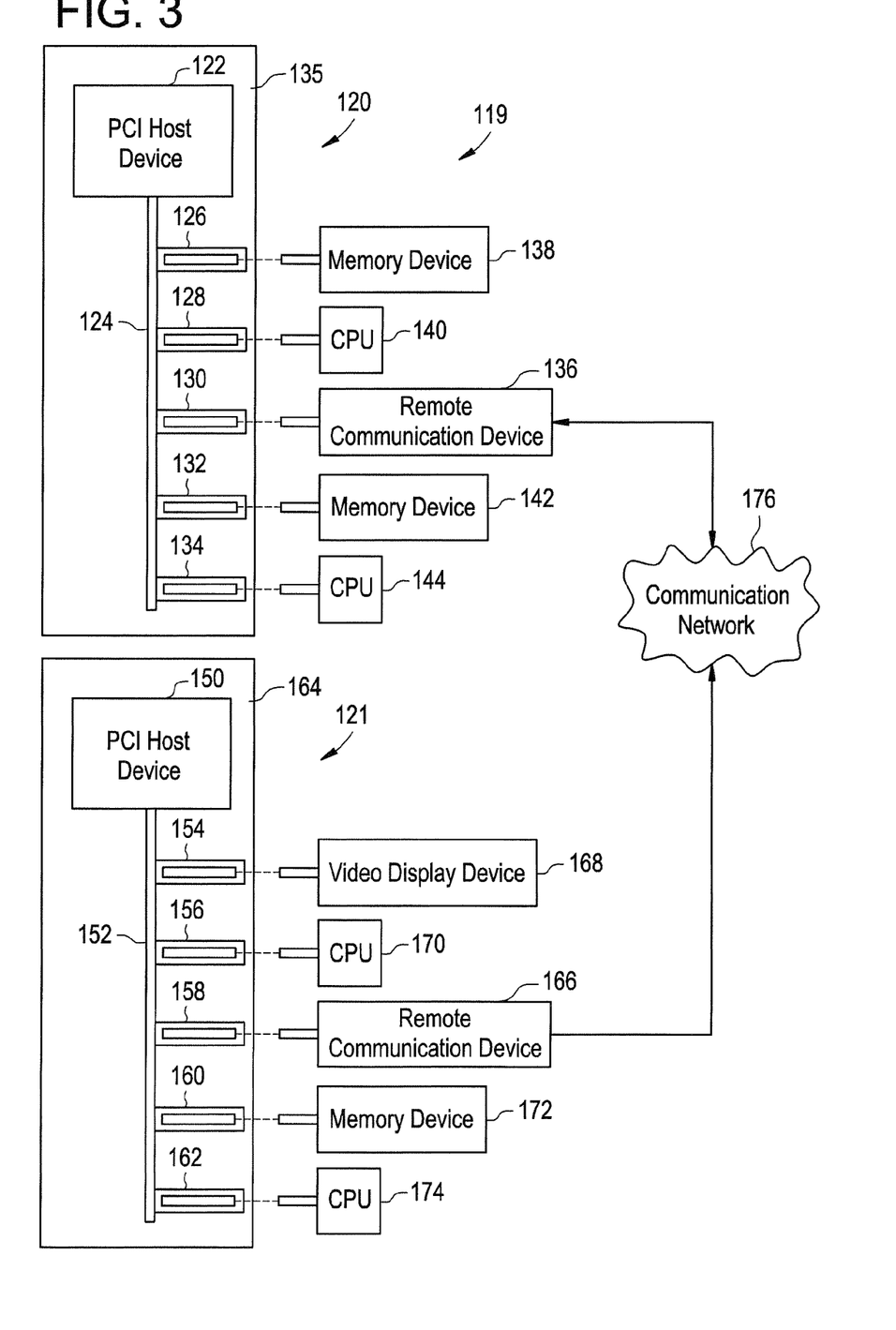
FIG. 3 is a schematic of the data processing system in accordance with still another exemplary embodiment.

Referring to FIG. 3, a data processing system 119 for controlling data communication between PCI devices in accordance with another exemplary embodiment is shown. The data processing system 119 includes a subsystem 120, a subsystem 121, and a communication network 176.

The subsystem 120 includes a PCI host device 122, a PCI bus 124, electrical connectors 126, 128, 130, 132, 134, a back plane 135, a remote communication device 136, a memory device 138, a CPU 140, a memory device 142, and a CPU 144. The back plane 135 comprises a substrate on which the PCI host device 122, the PCI communication bus 124, and the electrical connectors 126, 128, 130, 132, 134 are attached. The PCI host device 122 assigns a unique address range for each of the devices communicating over the PCI communication bus 124. Further, the PCI host device 122 configures the PCI interfaces in each of the devices communicating through the bus 124 and enables the PCI interfaces. Further, the PCI host device 122 authorizes only one device coupled to the bus 124 to communicate at a time on the bus 124.

The PCI host device 122 is electrically coupled to the PCI communication bus 124 and to the electrical connectors 126, 128, 130, 132, 134. The electrical connectors 126, 128, 130, 132, 134 are electrically coupled to the bus 124.

The remaining devices of the subsystem 120 are electrically coupled to the PCI communication bus 124 via the electrical connectors. In particular, the memory device 138, the CPU 140, the remote communication device 136, the memory device 142, and the CPU 144 are electrically coupled to the electrical connectors 126, 128, 130, 132, 134, respectively.

The subsystem 121 includes a PCI host device 150, a PCI bus 152, electrical connectors 154, 156, 158, 160, 162, a back plane 164, a video display device 168, a CPU 170, a remote communication device 166, a memory device 172, and a CPU 174. The back plane 164 comprises a substrate on which the PCI host device 150, the PCI communication bus 152, and the electrical connectors 154, 156, 158, 160, 162 are attached. The PCI host device 150 assigns a unique address range for each of the devices communicating through the PCI communication bus 152. Further, the PCI host device 150 configures the PCI interfaces in each of the devices communicating through the bus 152 and enables the PCI interfaces. Further, the PCI host device 150 authorizes only one device coupled to the bus 152 to communicate at a time on the bus 152. The PCI host device 150 is electrically coupled to the bus 152 and to the electrical connectors 154, 156, 158, 160, 162. The electrical connectors 154, 156, 158, 160, 162 are also electrically coupled to the bus 152.

The remaining devices of the subsystem 121 are electrically coupled to the PCI communication bus 152 via the electrical connectors. In particular, the video display device 168, the CPU 170, the remote communication device 166, the memory device 172, and the CPU 174 are electrically coupled to the electrical connectors 154, 156, 158, 160, 162, respectively.

The data processing system 119 further includes a communication network 176 that is operably coupled between the subsystems 120 and 121. In particular, the network 176 is electrically coupled between the remote communication device 136 and the remote communication device 166. The remote communication devices 136, 166 and the communication network 176 allow devices on the PCI communication bus 124 to communicate with devices on the PCI communication bus 152, and vice versa.

Figure 5:
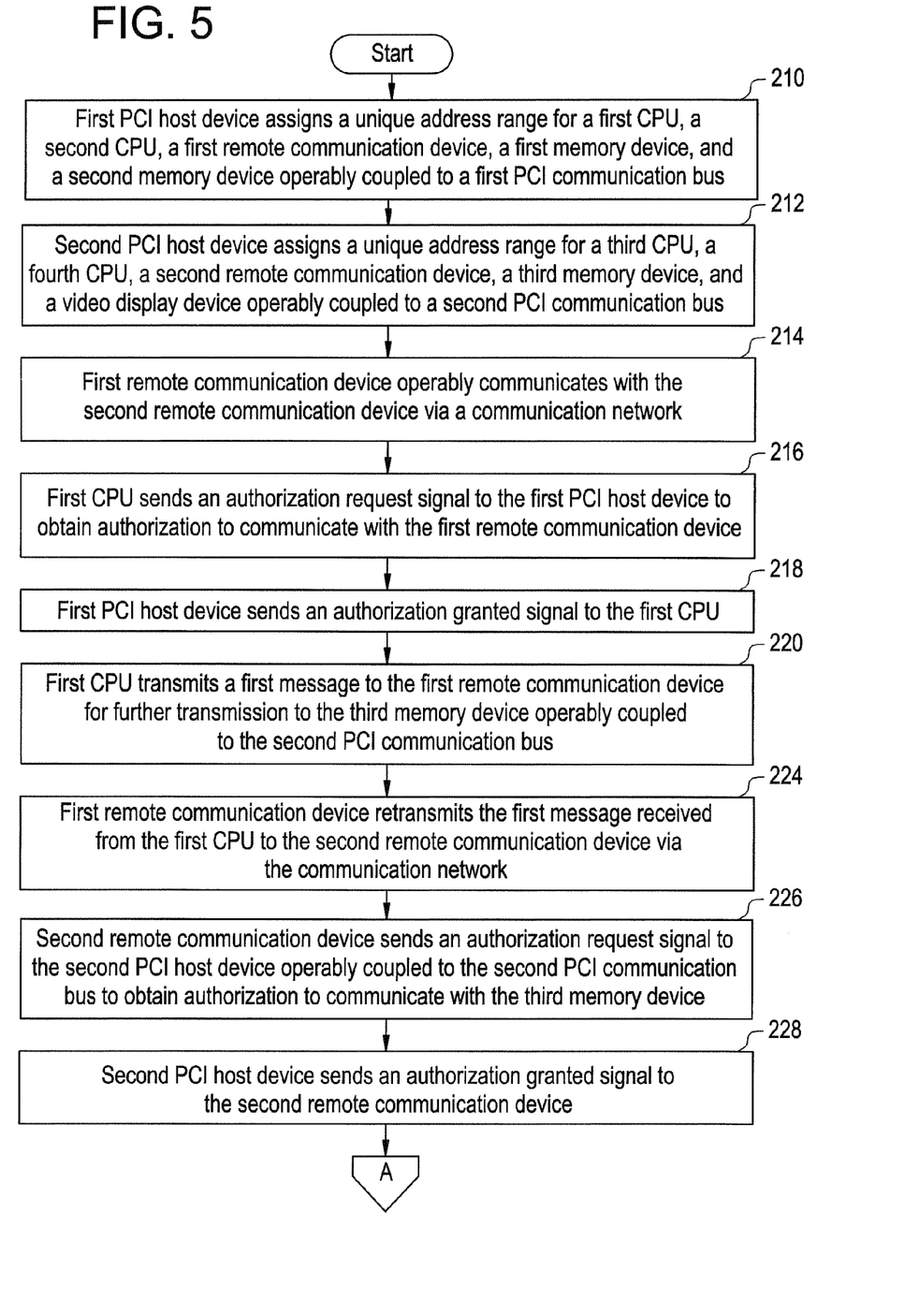
FIGS. 5 and 6 are a flowchart of a method for controlling communication in the data processing system of the FIG. 3.
Figure 6:
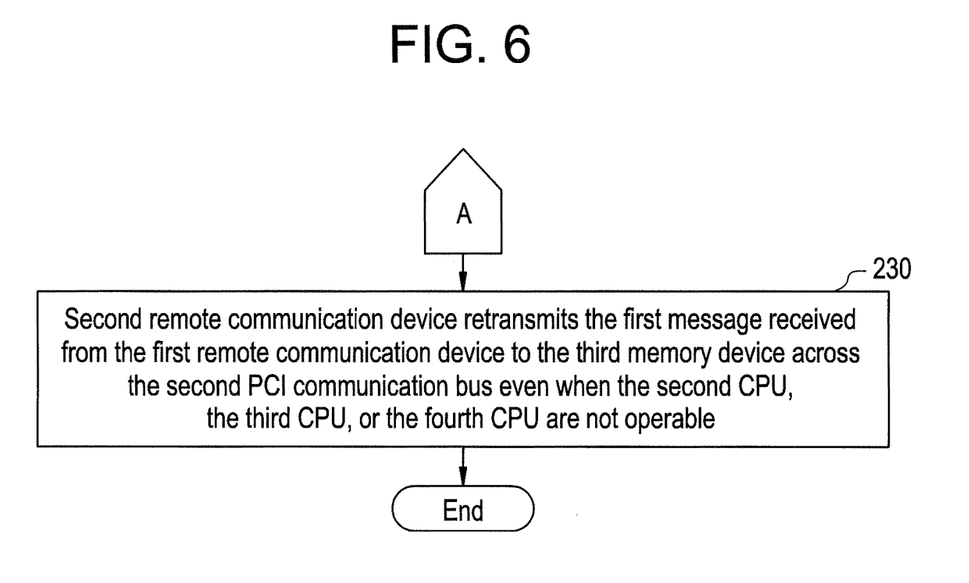

Referring to FIGS. 5 and 6, a method for transmitting data within the data processing system 119 will now explained. It should be noted that although communication between the CPU 140 and the memory device 172 will be utilized to describe the operation of the system 119, any two devices on the busses 124 and 152 can communicate with one another even if one or more of CPUs 140, 144, 170, and 174 are not operable.

At step 210, the PCI host device 122 assigns a unique address range for the CPU 140, the CPU 144, the remote communication device 136, the memory device 138, and the memory device 142, operably coupled to the PCI communication bus 124. Further, the PCI host device 122 configures the PCI interfaces in each of the CPU 140, the CPU 144, the remote communication device 136, the memory device 138, and the memory device 142 and enables the PCI interfaces.

At step 212, the PCI host device 150 assigns a unique address range for the CPU 170, the CPU 174, the remote communication device 166, the memory device 172, and the video display device 168, operably coupled to the PCI communication bus 152. Further, the PCI host device 150 configures the PCI interfaces in each of the remote communication device 166, the memory device 172, and the video display device 168 and enables the PCI interfaces.

At step 214, the remote communication device 136 operably communicates with the remote communication device 166 via the communication network 176.

At step 216, the CPU 140 sends an authorization request signal to the PCI host device 122 to obtain authorization to communicate with the remote communication device 136.

At step 218, the PCI host device 122 sends an authorization granted signal to the CPU 140.

At step 220, the CPU 140 transmits a first message to the remote communication device 136 for further transmission to the memory device 172 operably coupled to the PCI communication bus 152.

At step 224, the remote communication device 136 retransmits the first message received from the CPU 140 to the remote communication device 166 via the communication network 176.

At step 226, the remote communication device 166 sends an authorization request signal to the PCI host device 150 operably coupled to the PCI communication bus 152 to obtain authorization to communicate with the memory device 172.

At step 228, the PCI host device 150 sends an authorization granted signal to the remote communication device 166.

At step 230, the remote communication device 166 retransmits the first message received from the remote communication device 136 to the memory device 172 across the PCI communication bus 152 even when the CPU 144, the CPU 170, or the CPU 174 are not operable.

An advantage of the data processing system 119 is that devices attached to the bus 124 can communicate with devices attached to the bus 152, even if one or more CPUs are not operable on either of the busses 124 and 152. For example, the CPU 140 on bus 124 can communicate with memory device 172 on bus 152, via the communication network 176, even if CPU 144, CPU 170, and CPU 174 are not operable.

Thus, the data processing system 119 provides a technical effect of allowing communication over one or more PCI busses even if CPUs connected to the busses are not operable.

While embodiments of the invention are described with reference to the exemplary embodiments, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, is intended that the invention not be limited the embodiment disclosed for carrying out this invention, but that the invention includes all embodiments falling with the scope of the intended claims. Moreover, the use of the term's first, second, etc. does not denote any order of importance, but rather the term's first, second, etc. are used to distinguish one element from another.

What is claimed is:

1. A data processing system, comprising:
a first host device operably coupled to a first PCI communication bus wherein the first host device substantially only performs tasks associated with facilitating communication through the first PCI communication bus;
a first processing device operably coupled to the first PCI communication bus; and
second and third devices both operably coupled to the first PCI communication bus, the second device being configured to request authorization from the first host device to transmit a first message through the first PCI communication bus, wherein the second device transmits the first message to the third device upon receipt of the authorization from the first host device even if the first processing device is not operable.

2. The data processing system of claim 1, wherein the first host device comprises a PCI host device.

3. The data processing system of claim 1, wherein the first host device and the first PCI communication bus are disposed on a first backplane.

4. The data processing system of claim 3, further comprising a first electrical connector coupled to the first backplane and further operably coupled to the first PCI communication bus.

5. The data processing system of claim 4, wherein the first processing device is electrically connected to the first PCI communication bus via the first electrical connector.

6. The data processing system of claim 1, wherein the first host device assigns first, second, and third address ranges to the first processing device and the second and third devices, respectively.

7. The data processing system of claim 1, wherein the first host device receives a request from the second device to transmit the first message to the third device, wherein the first host device authorizes the second device to transmit the first message when no other devices are authorized to communicate over the first PCI communication bus.

8. The data processing system of claim 1, wherein the second device comprises a second processing device.

9. The data processing system of claim 8, wherein the third device comprises one of a processing device, a network communication device, an I/O device, a video display device, and a modem.

10. The data processing system of claim 1, further comprising:
a second host device operably coupled to a second PCI communication bus wherein the second host device only performs tasks associated with facilitating communication through the second PCI communication bus;
a fourth device operably coupled to the second PCI communication bus; and
a first communication device operably facilitating communication between the first and second PCI communication buses, wherein the fourth device communicates with the second device via the first communication device even if the first processing device is not operable.

11. The data processing system of claim 10, wherein the second host device comprises a PCI host device.

12. The data processing system of claim 10, wherein the second host device and the second PCI communication bus are disposed on a second backplane.

13. The data processing system of claim 12, further comprising a second electrical connector coupled to the second backplane and further operably coupled to the second PCI communication bus.

14. The data processing system of claim 13, wherein the fourth device is electrically connected to the second PCI communication bus via the second electrical connector.

15. The data processing system of claim 10, wherein the fourth device comprises a second processing device.

16. The data processing system of claim 10, further comprising a fifth device operably coupled to the second PCI communication bus, wherein the fifth device communicates with the fourth device via the second PCI communication bus even if the first processing device coupled to the first PCI communication bus is not operable.

17. A data processing system, comprising:
a first host device means operably coupled to a first PCI communication bus for only performing tasks associated with facilitating communication through the first PCI communication bus;
a first processing device means operably coupled to the first PCI communication bus for performing computational tasks; and second and third device means both operably coupled to the first PCI communication bus for communicating with one another, the second device means being configured to request authorization from the first host device means to transmit a first message through the first PCI communication bus, wherein the second device means transmits the first message to the third device means upon receipt of the authorization from the first host device means even if the first processing device means is not operable.

18. A data processing system, comprising:
a first back plane having a first host device, a first PCI communication bus, and first, second, and third electrical connectors, the first host device being operably coupled to the first PCI communication bus, the first PCI communication bus being operably coupled to the first, second, and third, electrical connectors, wherein the first host device only performs tasks associated with facilitating communication through the first PCI communication bus;
a first processing device operably coupled to the first PCI communication bus via the first electrical connector; and
second and third devices both operably coupled to the first PCI communication bus via the second and third electrical connectors, respectively, the second device being configured to request authorization from the first host device to transmit a first message through the first PCI communication bus, wherein the second device transmits the first message to the third device upon receipt of the authorization from the first host device even if the first processing device is not operable.

19. A method for controlling a data processing system, the data processing system having a first host device operably coupled to a first PCI communication bus wherein the first host device only performs tasks associated with facilitating communication through the first PCI communication bus, and a first processing device operably coupled to the first PCI communication bus, and second and third devices both operably coupled to the first PCI communication bus, the method comprising:
sending an authorization request signal from the second device to the first host device requesting authorization to transmit a first message over the first PCI communication bus; and
upon receipt of the authorization from the first host device by the second device, transmitting the first message from the second device to the third device even if the first processing device is not operable.

20. An article of manufacture, comprising:
a computer storage medium having a computer program encoded therein for controlling a data processing system, the data processing system having a first host device operably coupled to a first PCI communication bus wherein the first host device only performs tasks associated with facilitating communication through the first PCI communication bus, and a first processing device operably coupled to the first PCI communication bus, and second and third devices both operably coupled to the first PCI communication bus, the computer storage medium comprising:
code for sending an authorization request signal from the second device to the first host device requesting authorization to transmit a first message over the first PCI communication bus; and
code for transmitting the first message from the second device to the third device even if the first processing device is not operable, upon receipt of the authorization from the first host device by the second device.

* * * * *